US012471771B2

(12) United States Patent
Grondin et al.

(10) Patent No.: US 12,471,771 B2
(45) Date of Patent: Nov. 18, 2025

(54) VISUAL TESTING USING MOBILE DEVICES

(71) Applicant: Tilak Healthcare, Paris (FR)

(72) Inventors: Elidia Grondin, St. Germain en Laye (FR); Denis Tribouillois, Montreuil (FR); Laurent Herledan, Vincennes (FR); Mathieu Lagadec, Paris (FR)

(73) Assignee: Tilak Healthcare, Paris (FR)

( * ) Notice: Subject to any disclaimer, the term of this patent is extended or adjusted under 35 U.S.C. 154(b) by 946 days.

(21) Appl. No.: 16/982,919

(22) PCT Filed: Mar. 18, 2019

(86) PCT No.: PCT/EP2019/056685
§ 371 (c)(1),
(2) Date: Sep. 21, 2020

(87) PCT Pub. No.: WO2019/179931
PCT Pub. Date: Sep. 26, 2019

(65) Prior Publication Data
US 2021/0007599 A1    Jan. 14, 2021

(30) Foreign Application Priority Data
Mar. 22, 2018    (EP) ..................................... 18163352

(51) Int. Cl.
*A61B 3/032*   (2006.01)
*A61B 3/00*    (2006.01)
*A61B 3/10*    (2006.01)

(52) U.S. Cl.
CPC ............ *A61B 3/032* (2013.01); *A61B 3/0033* (2013.01); *A61B 3/0041* (2013.01); *A61B 3/10* (2013.01);
(Continued)

(58) Field of Classification Search
CPC ..... A61B 3/032; A61B 3/0033; A61B 3/0041; A61B 2560/0247; A61B 2560/0431; A61B 2562/0257; A61B 3/111; A61B 3/10
See application file for complete search history.

(56) References Cited

U.S. PATENT DOCUMENTS 5,880,814 A    3/1999   McKnight et al.
8,881,058 B2   11/2014  Ollivierre et al.
(Continued)

FOREIGN PATENT DOCUMENTS

CN    1706340 A    12/2005
CN    103793719 A    5/2014
(Continued)

OTHER PUBLICATIONS

Bastawrous et al., "The Development and Validation of a Smartphone Visual Acuity Test (Peek Acuity) for Clinical Practice and Community-Based Fieldwork", JAMA Ophthalmol., 133(8), 930-937, published Aug. 2015 (Year: 2015).*
(Continued)

*Primary Examiner* — Jennifer Robertson
*Assistant Examiner* — Jonathan Drew Moroneso
(74) *Attorney, Agent, or Firm* — Greenberg Traurig, LLP; Christopher C. Bolten; Robert D. Ward

(57) ABSTRACT

A mobile device and a method for testing an individual's vision are provided, the mobile device including a screen for displaying at least one test pattern, such as a smartphone or a tablet computer. A test of the individual's vision is performed using the test pattern displayed on the screen of the mobile device, in particular for testing visual acuity, contrast sensitivity and/or visual disturbances. Further, a parameter influencing the test result is evaluated before and/or during performing the test. The parameter includes at least one of
(Continued)

the distance between the eye of the individual and the screen; the brightness at which the test pattern is displayed; and the ambient luminosity.

17 Claims, 5 Drawing Sheets

(52) U.S. Cl.
CPC .............. *A61B 2560/0247* (2013.01); *A61B 2560/0431* (2013.01); *A61B 2562/0257* (2013.01)

(56) References Cited

U.S. PATENT DOCUMENTS

| | | | |
|---|---|---|---|
| 9,597,253 B2* | 3/2017 | Seewald | A61B 5/4833 |
| 9,743,828 B2 | 8/2017 | Bartlett et al. | |
| 9,820,643 B2 | 11/2017 | Borden et al. | |
| 2008/0309879 A1 | 12/2008 | Hirji | |
| 2010/0283969 A1* | 11/2010 | Cooperstock | A61B 3/022 351/201 |
| 2011/0228227 A1* | 9/2011 | Roser | A61B 3/032 351/239 |
| 2012/0050685 A1* | 3/2012 | Bartlett | A61B 3/111 351/246 |
| 2013/0128229 A1 | 5/2013 | Huang | |
| 2013/0141697 A1 | 6/2013 | Berry et al. | |
| 2015/0150444 A1 | 6/2015 | Bex et al. | |
| 2015/0190048 A1 | 7/2015 | Huang | |
| 2015/0346987 A1 | 12/2015 | Ren et al. | |
| 2016/0078594 A1 | 3/2016 | Scherlen | |
| 2016/0346607 A1* | 12/2016 | Rapfogel | G09B 19/0038 |
| 2017/0049316 A1* | 2/2017 | Donaldson | A61B 3/0033 |
| 2017/0053604 A1 | 2/2017 | Li et al. | |
| 2017/0181618 A1* | 6/2017 | Steinmueller | A61B 3/005 |
| 2018/0108294 A1 | 4/2018 | Kwon et al. | |
| 2019/0258054 A1 | 8/2019 | Yoon | |
| 2020/0253471 A1* | 8/2020 | Prevoo | A61B 3/14 |
| 2022/0061651 A1 | 3/2022 | Carroll et al. | |

FOREIGN PATENT DOCUMENTS

| | | | |
|---|---|---|---|
| CN | 105832283 A | | 8/2016 |
| DE | 102015204640 A1 * | | 9/2016 |
| JP | S6185918 A | | 5/1986 |
| JP | 2007020919 A | | 2/2007 |
| JP | 2008005961 A | | 1/2008 |
| JP | 2014533587 A | | 12/2014 |
| WO | WO-9818381 A1 | | 5/1998 |
| WO | WO-03057021 A1 | | 7/2003 |
| WO | WO-2017152649 A1 | | 9/2017 |
| WO | WO-2019017785 A1 | | 1/2019 |

OTHER PUBLICATIONS

Machacek, German Patent Document DE 102015204640 A1, translation from Espacenet (Year: 2016).*
"How to convert lux to candela", RapidTables, accessed on May 31, 2024, accessed at https://www.rapidtables.com/calc/light/ how-lux-to-candela.html (Year: 2024).*
International Search Report & Written Opinion dated Jun. 23, 2021 in Int'l PCT Patent Appl. Serial No. PCT/EP2021/059702.
Amsler, Marc, *Earliest Symptoms of Diseases of the Macula*, Brit. J. Ophthal., 37:521 (1953).
Extended European Search Report dated Aug. 14, 2018 in EP Patent Appl. Serial No. 18163352.0.
International Search Report & Written Opinion dated Jun. 26, 2019 in Int'l PCT Patent Appl. Serial No. PCT/EP2019/056685.
Pelli, et al., *The Design of a New Letter Chart for Measuring Contrast Sensitivity*, Clin. Vision Sci., 2(3):187-199 (1988).
Bilhaut et al. "A Therapeutic Video Game Arrives on Smartphone"—English Translation of French Article "Un jeu video therapeutique debarque sur smartphone," Le Quotidien du Medecin., (Oct. 2017).
Gutierrez-Martinez, et al. "Smartphones as a Light Measurement Tool: Case of Study," Applied Sciences, 7(6):616 (Jun. 2017).
Keating, M. P., "The Geometric Behavior of Light," Geometric, Physical, and Visual Optics, Chapter 2, pp. 13-28 (1998).
König et al. "A new context: Screen to face distance," In 2014 8th International Symposium on medical Information and Communication Technology (ISMICT) (IEEE), pp. 1-5 (Apr. 2014).
Li et al., "Look into My Eyes: Fine-grained Detection of Face-screen Distance on Smartphones," In 2016 12th International Conference on Mobile Ad-Hoc and Sensor Networks (MSN) (IEEE), pp. 258-265 (Dec. 2016).
Loshin, D.S. "Chapter 1—Introduction to Geometrical Optics," The Geometrical Optics Workbook, pp. 1-20 (1991).
Rahman et al., "Person to Camera Distance Measurement Based on Eye-Distance," In 2009 Third International Conference on Multimedia and Ubiquitous Engineering, pp. 137-141 (Jun. 2009).
Ravnik et al., "Interactive and Audience Adaptive Digital Signage Using Real-Time Computer Vision," International Journal of Advanced Robotic Systems, 10(2):107 (Feb. 2013).
Ricci et al., "Standardized measurement of visual acuity", Ophthalmic Epidemiology, vol. 5(1):41-53 (Jan. 1998).
Third Party Observation dated Feb. 2, 2023 in EP Patent Application Serial No. 19713722.7 (8 pages).
Bach, M. "Anti-aliasing and dithering in the Freiburg Visual Acuity Test," Spatial Vision, vol. 11(1):85-89 (Jan. 1997).

* cited by examiner (a)

(b)

(a)

(b)

VISUAL TESTING USING MOBILE DEVICES

This application is a national phase application under 35 U.S.C. § 371 of PCT/EP2019/056685, filed Mar. 18, 2019, which claims priority to EP patent application Ser. No. 18/163,352.0, filed Mar. 22, 2018, the entire contents of each of which are incorporated herein by reference.

The present invention relates to a mobile device for testing an individual's vision, in particular the use of a patient's mobile device, such as a smartphone or a tablet computer that is adapted to allow the patient to regularly perform visual tests that provide conclusive results. Patients suffering from a chronic macular disease require a regular monitoring of their visual parameters from a physician, usually an ophthalmologist. The diseases include, but are not limited to, wet forms of AMD (age-related macular degeneration), dry AMD at risk of neovascularization, diabetic retinopathy with or without macular edema and high myopia with risk of neovascularization. Many of these patients are over 50 years old, have co-morbidities and poly-pharmacy, particularly after suffering for many years from diabetes.

The visual parameters are usually tested using standardized methods at the ophthalmologist's office in order to monitor the progression of the individual's vision and/or disease. Depending on the actual situation, the tests that are regularly performed include the monitoring of near visual acuity, contrast sensitivity and/or visual disturbances, like metamorphosis and scotoma.

It is difficult to estimate at which time interval the tests should reasonably be repeated. On the one hand, retinal diseases for example are stable over an extended period of time, such as several months or even years. However, on the other hand, a sudden degradation of the vision may occur, which often needs an immediate treatment in order to avoid permanent damage. Therefore, the tests are usually repeated at least every three months by the physician.

The need of regularly visiting a physician is not only cumbersome for the patient but also cost intensive. It would therefore be desirable to provide the patient with the possibility for self-testing. The results of self-testing should be comparable or even equivalent to the outcome of tests performed under well defined conditions at the physician's office. In particular, the test results should allow a physician to estimate the need for further examination and/or therapy of the monitored disease, such as retinal disease.

Patent applications US2015/190048 and US2013/128229 describe systems and methods for monitoring macular and retinal diseases comprising video game test implemented on a hardware platform including a video monitor, a device display and a video camera. Nevertheless, the use of the said hardware platform is limited by certain conditions:
  (i) the test subject's eye requires to be approximately at equal distance (D) to the top and bottom of the device display (from about 43 cm to about 48 cm), this implies that the device display is preferably positioned on a stand and requires strict method for measuring distance D;
  (ii) measurement of said distance D is monitored by the video camera with respect to one eye only and requires the use of visible feature of precise and known dimensions that can be captured by said camera. This visible feature can be designed on an occluder mounted on spectacles in front of one user's eye or correspond to the corneal width of the subject's eye. Therefore, this implies that such visible feature with precise and known dimensions is available. Additionally, according to this system, due to the occluder, the user's eyes can only be tested in a sequential fashion;
  (iii) the video camera is further used to monitor ambient light level as the methods must be performed in dim room lighting (low scotopic). Moreover, while the brightness of the screen is not monitored during the visual test it is automatically adjusted according to the measured ambient light level and the user can be instructed to increase or decrease the room lighting appropriately. Therefore, this limits the conditions of use of the systems and methods.

Thus, there is still a need for device to perform a visual test which is not limited to particular condition of use or specific user dependent requirements.

To increase the significance of the visual test results, and to preferably make them comparable to tests performed in a physician's office, at least one ambient parameter may be evaluated. The parameter may be evaluated prior to performing the test or, preferably, is monitored during performing the test. In particular at least one of the distance of the individual's eye to be tested from the screen, the brightness of the screen, and the ambient luminosity is controlled to be within a certain range during the test.

It is thus an object of the present invention to provide a mobile device to perform a visual test. In particular, the present invention is based on the idea to use mobile devices, such as smartphones or tablet computers, for self-testing a patient's vision. In order to provide conclusive results, at least one parameter that may have an influence on the test result, such as the distance of the patient to the screen or the brightness of the screen or the surroundings (ambient luminosity), is monitored prior to performing the test and/or during performing the test.

According to preferred embodiment, both the distance of the patient from the screen and the ambient luminosity are monitored prior to performing the test and/or during performing the test.

According to more preferred embodiment, both the distance of the patient from the screen, the brightness of the screen and the surroundings are monitored prior to performing the test and/or during performing the test.

According to more preferred embodiment, at least one of the said parameter is monitored prior to performing the test and during performing the test.

The Invention thus relates to a mobile device for testing an individual's vision, the mobile device including a screen for displaying a test pattern, wherein the mobile device is configured:
  (i) to perform at least one test of the individual's vision using at least one test pattern displayed on the screen of the mobile device, and
  (ii) to evaluate at least one parameter selected in the group of:
    the distance between the eye of the individual and the screen;
    the brightness at which the test pattern is displayed; and
    the ambient luminosity.

According to preferred embodiment, the mobile device of the Invention is configured (ii) to evaluate the distance between the eye of the individual and the screen and the ambient luminosity.

According to preferred embodiment, the mobile device of the Invention is configured (ii) to evaluate the distance between the eye of the individual and the screen, the brightness at which the test pattern is displayed and the ambient luminosity.

According to preferred embodiment, the mobile device of the Invention is configured (ii) to evaluate the brightness at which the test pattern is displayed the said brightness being determined independently from the ambient luminosity measurement.

According to preferred embodiment, the said mobile device further includes a camera capturing image, particularly video image. According to preferred embodiment, the said mobile device is selected in the group of smartphones and tablet computers because of their widespread use. Furthermore, smartphones or tablet computers generally provide a high display quality and usually include additional sensors that may be advantageously used according to the present invention.

According to specific embodiment, the said parameter is evaluated prior to performing the test. According to preferred embodiment, at least two of the said parameters are evaluated prior to performing the test. According to even more preferred embodiment, all the said parameters are evaluated prior to performing the test.

According to preferred embodiment, the said parameter is monitored during performing the test. According to preferred embodiment, at least two of the said the parameters are evaluated during performing the test. According to even more preferred embodiment, all the said parameters are evaluated during performing the test.

According to preferred embodiment, the said parameter is monitored prior to and during performing the test. According to preferred embodiment, at least two of the said the parameters are evaluated prior to and during performing the test. According to even more preferred embodiment, all the said parameters are evaluated prior to and during performing the test.

According to a special embodiment, the distance between the eye of the individual and the screen and the ambient luminosity are evaluated prior to performing the test and during performing the test. According to this alternative embodiment, the brightness at which the test pattern is displayed can further be evaluated prior to performing the test and/or during performing the test.

The term "patient" or "individual" as used herein refers to any subject for whom it is desired to monitor vision, vision progression and/or disease. It might refer to healthy patient as well as patients suffering from disease, more particularly retinal diseases, especially chronic macular diseases. These diseases include, but are not limited to, wet forms of AMD (age-related macular degeneration), dry AMD at risk of neovascularization, diabetic retinopathy with or without macular edema and high myopia with risk of neovascularization.

The term "about" as used herein means within 10%, preferably within 8%, and more preferably within 5% of a given value or range. According to a specific embodiment, "about X" means X.

For evaluating the distance between the eyes of the individual to be tested and the screen, the face of the individual may be tracked before and/or during the test using for example the camera of the mobile device. According to preferred embodiment, in the image of the user's face captured by the said camera, the eyes of the user are recognized, and their distance from one another is measured. Based on the measured distance between the two eyes, in relation to the actual distance between the eyes (which may either be based on known standard values or may be measured and stored previously) and the parameters of the device's camera, the distance between the eye of the individual and the screen may be determined. One advantage of measuring the distance from the two eyes of the individual is that this does not necessitate the use of visible feature of precise and known dimensions, and particularly of artificial features. Additionally, this measure of the distance from one user's eye to another is easy to be handled by the patient without special training.

The invention therefore concerns a mobile device as disclosed above, wherein said distance between the eye of the individual and the screen is evaluated by detecting the face of the user on the image fed from camera of the device and computing the distance between the two eyes inside the said image in order to estimate the distance between the device and the eye.

According to a preferred embodiment, the distance between the eye of the individual and the screen is evaluated prior to performing the test by measuring the distance from the two eyes of the individual as above explained and is monitored during performing the test by any other method of the art. According to another preferred embodiment, the distance between the eye of the individual and the screen is evaluated prior to performing the test by measuring the distance from the two eyes of the individual as above explained and is monitored during performing the test by any other method of the art allowing to occlude one of the two eyes (monocular test).

The distance between the eye to be tested and the screen is preferably within a defined range. It is preferably selected in the range from about 30 cm and about 50 cm, advantageously between about 35 cm and about 45 cm, ideally at about 40 cm. If the distance falls outside this range during a test, a warning may be displayed to the user, asking the user to adjust his/her position with regard to the screen. Additionally or alternatively, the test may be stopped and only continued when the distance between the eye to be tested of the individual and the screen is back in the preferred range. According to special embodiment, the two individual's eyes are tested simultaneously (binocular test) or individually (monocular test).

Therefore according to special embodiment, the invention relates to a mobile device wherein the mobile device is configured to evaluate the distance between the eye of the individual and the screen by tracking the face of the individual using a camera of the mobile device and using the distance between the two individual's eyes, and to determine whether the estimated distance between the eyes and the screen is within a defined range, in particular from about 30 cm and about 50 cm, advantageously between about 35 cm and about 45 cm, ideally at about 40 cm.

The invention further concerns a mobile device as disclosed above, wherein said distance between the eye of the individual and the screen is evaluated by detecting the face of the user on the images fed from camera of the device and computing the distance between the two eyes inside the said image in order to estimate the distance between the device and the eye.

According to the present invention, the mobile device is controlled such that the screen brightness at which the test pattern is displayed is preferably selected in the range from about 100 lux to about 300 lux, more preferably from about 150 lux to about 250 lux, and even more preferably is about 200 lux. According to preferred embodiment, the possibility for the user to manually change the brightness of the display is disabled during performing the test.

Therefore according to a special embodiment, the invention relates to a mobile device wherein the mobile device is configured to control the brightness at which the test pattern is displayed to be within a predefined range, in particular selected in the range from about 100 lux to about 300 lux, more preferably from about 150 lux to about 250 lux, and even more preferably is about 200 lux.

Contrary to prior art mobile devices for monitoring individual's vision, the device of the present invention does not require to adjust the ambient light to low scotopic or dim room lighting. For information, typical room illumination is in the order of 300-500 lux, whereas outdoor light varies from 1500 lux on a cloudy day to 100000 lux on a sunny day. The present invention relates to mobile devices being configured to determine whether the ambient light is within a defined range. Preferably, the ambient luminosity is selected above low scotopic or dim room lighting. Preferably, the ambient luminosity is selected in the range from about 5 lux and about 2000 lux, more preferably it is above 5 lux, preferably from about 10 lux and about 2000 lux, and even more preferably it is above 10 lux.

For determining the ambient luminosity, a sensor included in the mobile device may be used. For example, the mobile device may comprise a dedicated light sensor, otherwise used to adapt the brightness, contrast and/or color temperature of the display, which may be used to monitor the ambient luminosity according to the present invention. Otherwise, one of the cameras, preferably the front camera, of the mobile device may be used for this purpose. Preferably, the ambient luminosity is selected in the range from about 5 lux and about 2000 lux, more preferably it is above 5 lux, preferably from about 10 lux and about 2000 lux, and even more preferably it is above 10 lux. Again, when the ambient luminosity is determined to be outside the preferred range, the test may be interrupted and/or a warning may be displayed requesting the individual to adjust the ambient luminosity, for instance by choosing another surrounding for performing the test.

According to special embodiment, the present invention relates to a mobile device configured to measure the ambient light, the mobile device being configured to determine whether the ambient light is within a defined range, in particular is selected in the range from about 5 lux and about 2000 lux, more preferably it is above 5 lux, preferably from about 10 lux and about 2000 lux, and even more preferably it is above 10 lux.

According to a preferred embodiment, the present invention relates to a mobile device, wherein the mobile device is configured to only allow for the test to be performed when the estimated distance between the eyes and the screen and/or the ambient luminosity is within the defined ranges.

According to a more preferred embodiment, the present invention relates to a mobile device, wherein the mobile device is configured to only allow for the test to be performed when the estimated distance between the eyes and the screen and the ambient luminosity is within the defined ranges.

According to an even more preferred embodiment, the present invention relates to mobile device, wherein the mobile device is configured to only allow for the test to be performed when:
- the estimated distance between the eyes and the screen is selected in the range from about 30 cm and about 50 cm, advantageously between about 35 cm and about 45 cm, ideally is about 40 cm, and
- the ambient luminosity is between about 5 lux and about 2000 lux, even more preferably it is above 10 lux.

The mobile device of the present invention includes a screen for displaying programs, applications or video games for testing or monitoring individual's vision. More precisely, the mobile device of the present invention includes a screen for displaying test pattern. The test pattern depends on the specific visual test that is to be performed (for example visual acuity test, contrast sensitivity test, visual disturbances test). According to a special embodiment, the mobile device of the present invention includes a screen for displaying a multiple choice test with subsequent test patterns.

When visual acuity should be tested, adaptation of well-known eye charts (e.g. Snellen or E Raskin charts) can be used. According to a special embodiment, when visual acuity should be tested, a symbol having the general form, e.g. of the letter "E", may be displayed, the legs of the E for example pointing in varying directions, such as left, right, up, and down. In the course of the test, the symbol may further vary in size.

Therefore according to a special embodiment, the invention further relates to mobile device wherein the test of the individual's vision includes testing visual acuity, more specifically near visual acuity, wherein when testing visual acuity, the screen is configured to display an optotype symbol, preferably having the general shape of an "E" at varying orientations and in varying sizes, wherein the orientation is to be indicated by the individual, in particular by using the touch screen of the mobile device. Results are indicated in letter number logMAR, decimal, Snellen or monoyer.

Furthermore, when contrast sensitivity should be tested, adaptation of well-known test (e.g. Landolt test) can be used. According to special embodiment, when contrast sensitivity should be tested, a symbol, for example a "C"-shaped symbol having a ring and a gap having varying orientations, again left, right, up, and down, and possibly, in addition, intermediate orientations. The symbol is further displayed in varying contrast. For performing the test, the individual is asked to indicate, in particular by using the touch screen of the mobile device, the orientation of various displayed symbols. From the correct and incorrect answers, vision parameters may be determined.

Therefore according to a special embodiment, the invention further relates to mobile device wherein the test of the individual's vision includes testing contrast sensitivity, wherein when testing contrast sensitivity, the screen is configured to display an optotype symbol, preferably having the general shape of a "C" with a ring at varying contrast values (for example from 0 to 1.8 logCS) and a gap having varying orientations, the orientation of the gab is to be indicated by the individual. Results are indicated in LogCS or percent.

Furthermore, when visual disturbances, in particular metamorphosia or scotoma, should be tested in the individual's field of view, adaptation of well-known test (e.g. Amsler grid) can be used. According to special embodiment, when visual disturbances, in particular metamorphosia or scotoma, should be tested, a grid having a central dot to be focused on by the individual, generally referred to as Amsler Grid, may be displayed on the screen. The individual to be tested is asked to indicate distorted and/or blurred areas in the grid, in particular by pointing to the respective areas by using the touch screen of the mobile device. The presence of distorted/blurred areas and their position may be taken as an indication for changes in the individual's retina, particularly the macula. In order to extend the field of view, the test may allow to move the grid, by using the functionality of the touch screen.

Therefore, according to a special embodiment, the invention further relates to a mobile device, wherein the screen is configured to display a grid with a central dot, for detecting visual disturbances as the test of the individual's vision, in particular metamorphosis or scotoma, wherein distorted and/or blurred areas are to be indicated by the individual while focusing the view on the dot.

According to the present invention a large number of test patterns well known by the one skilled in the art can be displayed on the screen of the mobile device of the invention to perform tests of the individual's vision.

In order to further improve the patient's motivation to regularly use his/her mobile device to perform the visual tests, the test patterns corresponding to visual tests may be embedded in a mobile gaming app executable on the mobile device. In order to be allowed to start or to continue gaming at certain points of the game, the user may be asked to do a visual test. The game may only be continued once the test is completed. Accordingly, the invention further relates to mobile device which is further configured to execute a game, wherein the game is only allowed to be performed or to be continued when, at predetermine time intervals, a visual test is performed.

The result of the visual test, in particular the results of several, consecutive visual tests may be stored in a memory of the mobile device. Therefore, according to a special embodiment, the invention further relates to a mobile device, wherein the mobile device comprises a memory for storing the result of the performed visual test.

Furthermore, the results may be transmitted, using the communication functions of the mobile device, e.g. to a data base or a secured server storing the medical records of the individual. Therefore, according to a special embodiment, the invention further relates to a mobile device, wherein the mobile device comprises a transmitter for sending the test result to a dashboard, that can be accessed online from the physician office, displaying medical data stored on a secured server.

According to preferred embodiment, the results can be accessed online by the physician, preferably from his office. The results of the tests may help the physician to decide whether or not the necessity for additional tests exists, that may then be performed at the physician's office and that may initiate a therapy. Thereby, the need for the patient to regularly come to the physician in short intervals may be avoided.

According to a special embodiment, the mobile device of the present invention is a smartphone or a tablet computer.

Thus, the mobile device according to the present invention provides the possibility to take into account parameters that are relevant for assessing the significance of the visual tests performed using specific sensors, contrary to available apps for smartphones or tablet computers, that merely allow to display test patterns on the screen of the mobile device. The present invention thus provides an improved mobile device for performing visual tests.

The invention further provides a method of testing an individual's vision. The method comprises performing a test of the individual's vision using a test pattern displayed on a screen of a mobile device, such as a smartphone or a tablet computer. The test of the individual's vision includes one or more of testing near visual acuity, testing contrast sensitivity, and detecting visual disturbances, in particular metamorphosis or scotoma. The method further comprises evaluating a parameter which includes at least one of the distance between the eye of the individual and the screen, the brightness at which the test pattern is displayed, and the ambient luminosity.

Therefore, the invention further relates to a method of testing an individual's vision, comprising the steps of:

(i) performing at least one test of the individual's vision using at least one test pattern displayed on a screen of a mobile device, such as a smartphone or a tablet computer, wherein the test of the individual's vision includes one or more of testing near visual acuity, testing contrast sensitivity, and detecting visual disturbances, in particular metamorphosis or scotoma, and (ii) evaluating a parameter which includes at least one of:
the distance between the eye of the individual and the screen;
the brightness at which the test pattern is displayed; and
the ambient luminosity.

According to a special embodiment, step (ii) is realized before step (i).

According to a special embodiment, step (ii) is realized concomitantly with step (i).

The invention further relates to the above method of testing an individual's vision, wherein the distance between the eye of the individual and the screen, and the ambient luminosity are evaluated.

The invention further relates to the above method of testing an individual's vision, wherein the distance between the eyes of the individual and the screen is evaluated by detecting the face of the user on the images fed from camera of the device and computing the distance between the two eyes inside the said image in order to estimate the distance between the device and the eye. According to a preferred embodiment, the method is performed when distance between the eyes and the screen is within a defined range, in particular from about 30 cm and about 50 cm, advantageously between about 35 cm and about 45 cm, ideally at about 40 cm.

The invention further relates to the above method of testing an individual's vision, wherein the mobile device further comprises a sensor configured to measure the ambient light, and the method is performed with ambient light within a defined range. Preferably, the ambient luminosity is selected above low scotopic or above dim room lighting. Preferably, the ambient luminosity is selected in the range from about 5 lux and about 2000 lux, more preferably it is above 5 lux, preferably from about 10 lux and about 2000 lux, and even more preferably it is above 10 lux.

In the following, the invention is explained in more detail with reference to the Figures, wherein FIG. 1 shows the screen of the mobile device according to an embodiment of the invention used for testing visual acuity;

Figure 1:
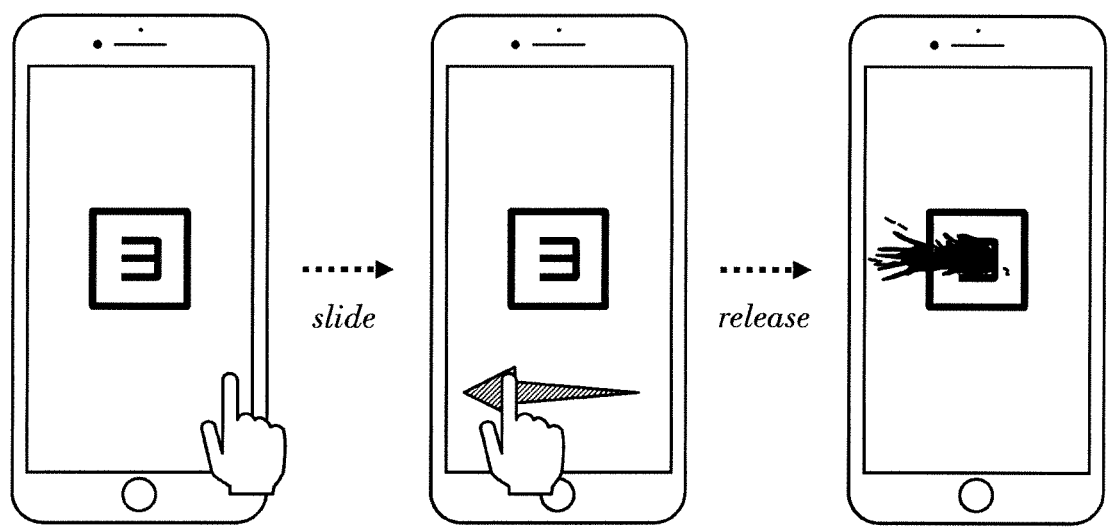

The aim of the present invention is to provide a mobile device, such as a tablet or smartphone, executing an application software (also referred to as "app" or "mobile app" in the following) for self-testing, that may be prescribed by a physician or ophthalmologist, intended to allow monitoring at least one of the following visual parameters: (near) visual acuity, contrast sensitivity, and detection of metamorphosis and scotoma. The tests should be equivalent, or at least similar, to the tests performed at the hospital or office with standardized methods.

Patients can perform the tests from home. Data results may be sent to a data base, preferably on a secured server, which may be used in a digital dashboard where the physician can visualize the data. When unusual results are detected, alerts indicating a change, in particular a deterioration of vision parameter, may be displayed in the dashboard and/or the mobile device which could lead to the scheduling of an additional visit upon physician decision.

A game part in the mobile app may be used to keep retention of the patient to the app and therefore to perform the test on a regular basis. According to special embodiment, the game part can analyze the behavior of the patient and detect anomalies which might trigger visual tests.

According to an embodiment of the invention, the mobile device may be embedded in a system that comprises the mobile device executing the mobile app and the online dashboard.

1. The mobile app comprises at least one of the following vision modules:
   a visual acuity module that allows the patient to test his visual acuity; it is based on the ETDRS (Early Treatment for Diabetic Retinopathy Study)
   a contrast sensitivity module that allows the patient to test his contrast sensitivity; it is based on the Pelli-Robson test
   the Amsler Grid module that allows to detect metamorphosis and scotomas; it is based on the paper Amsler Grid The mobile device may further execute at least one mobile app such as:
   a global module that provides login, main menu, parameters, notifications, etc.
   a videogame, such as puzzles allowing the retention of the user Each of the following tests can be performed on single eye (monocular) or on both eyes (binocular) of the patient.

The mobile device running the app sends data to the online dashboard that allows visualization of data streamed from the patients and alerts.

In the app, the vision modules aim to collect data related to vision which are normally obtained by using standardized methods at the ophthalmologist office. The videogame is a subtle balance between medical accuracy and digital entertainment, providing a smooth, refreshing and reassuring experience to the patient.

The physician (e.g. ophthalmologist) prescribes the mobile device running the app and optionally configurates the frequency and type of tests the patient should perform. Back home, the patient plays the game and performs regular medical exams through the vision modules. User's results are saved, by the application and sent to the doctor's dashboard. The dashboard displays the patient results and evolution. When a decrease of visual parameter(s) appears (visual acuity and contrast sensitivity, for example), the dashboard displays an alert to the physician, and the app displays a notification to the patient suggesting contacting his physician. The app and the dashboard should not give any recommendation nor interpretation of the test results. The app is not intended to diagnosis. The physician decides if the patient needs to be seen sooner than the next already scheduled visit. The diagnosis remains the responsibility of the prescribing physician.

In the following, the three vision modules are described in more detail.

1.1 Visual Acuity Module

The purpose of the Visual Acuity module is to assess the user's near visual acuity (NVA). The module is inspired by the standardized method ETDRS, the gold standard in ophthalmology for assessing the visual acuity of patients and for clinical research in ophthalmology.

The NVA module recreates the evaluation of visual acuity assed by the vision ETDRS chart. It proposes a short and interactive test to assess visual acuity in which the patient needs to indicate the orientation of the optotype "E", by sliding his finger in the corresponding direction (up, down, left or right). The optotype is known as "tumbling E", looking like the letter E.

Several selected optotypes, e.g. "E", are displayed, one by one, on the screen of the mobile device, preferably on the center of the screen, as shown in FIG. 1. The orientation and/or the size of the optotype changes after each patient response. The optotype orientation is random, but its size changes according to a predefined algorithm.

According to a special embodiment, this optotype is surrounded by a black square that recalls of "crowding bars", which simulate noise around the shape, as the other letters in a classic eye chart test would do. The width of the lines and the spaces between the bars of the optotype make it possible to maintain equal proportions whatever its size may be.

According to a special embodiment, optotypes are displayed with a 100% contrast on the screen like in the standard acuity test. According to a preferred embodiment, the background is white, the optotype and the bars around it are black.

According to a special embodiment, the optotype is displayed at the center of the screen. The patient is thus able to use the entire screen to indicate the direction in which he/she sees the optotype by sliding his/her finger in the corresponding direction on the touch screen of the mobile device.

The test can assess a range of visual acuity from 0.0 to about 0,3 logMAR, preferably from 0.0 to about 1.5 logMAR (Logarithm of the Minimum Angle of Resolution).

The algorithm used for assessing the visual acuity from the answers given by the patient is divided in two phases. The two phases can be independent. The first phase, the screening phase, illustrated in FIG. 2(*a*), is a phase to obtain an approximation of the visual acuity threshold. The second phase, the threshold phase, illustrated in FIG. 2(*b*), is a more complete testing phase to obtain the visual acuity score.

The screening phase is a standard staircase algorithm: if the user's answer is correct, a smaller "E" is presented and if not, a bigger "E" is presented. It stops after 2 false answers. The size of the "E" preceding the last false answer is taken as the threshold.

During the threshold phase, the optotype in the size determined as the threshold in the screening phase may be presented multiple times (e.g. 5 times). Subsequently, the algorithm presents harder steps, i.e. smaller optotypes, if previous answers are correct and easier steps if not. During this phase all the different sizes of optotypes may be mixed together.

Figure 2:
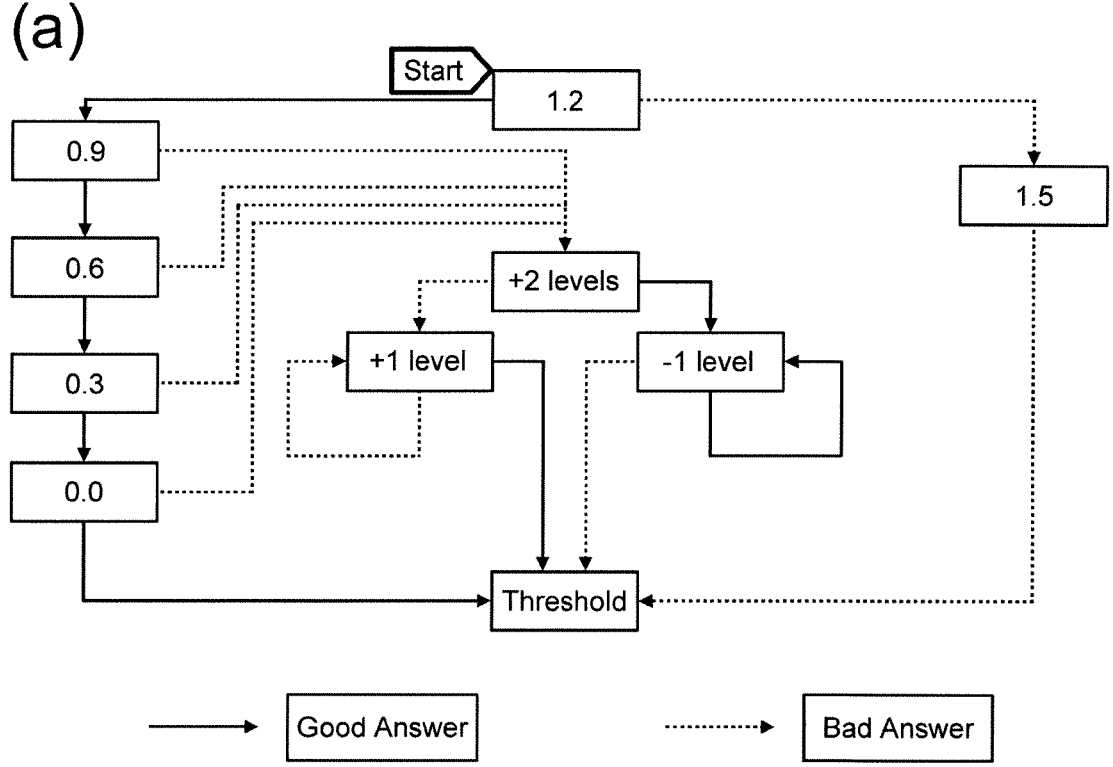
FIG. 2 illustrates an algorithm used for estimating visual acuity in (a) a screening phase and (b) a threshold phase.
Figure 2:
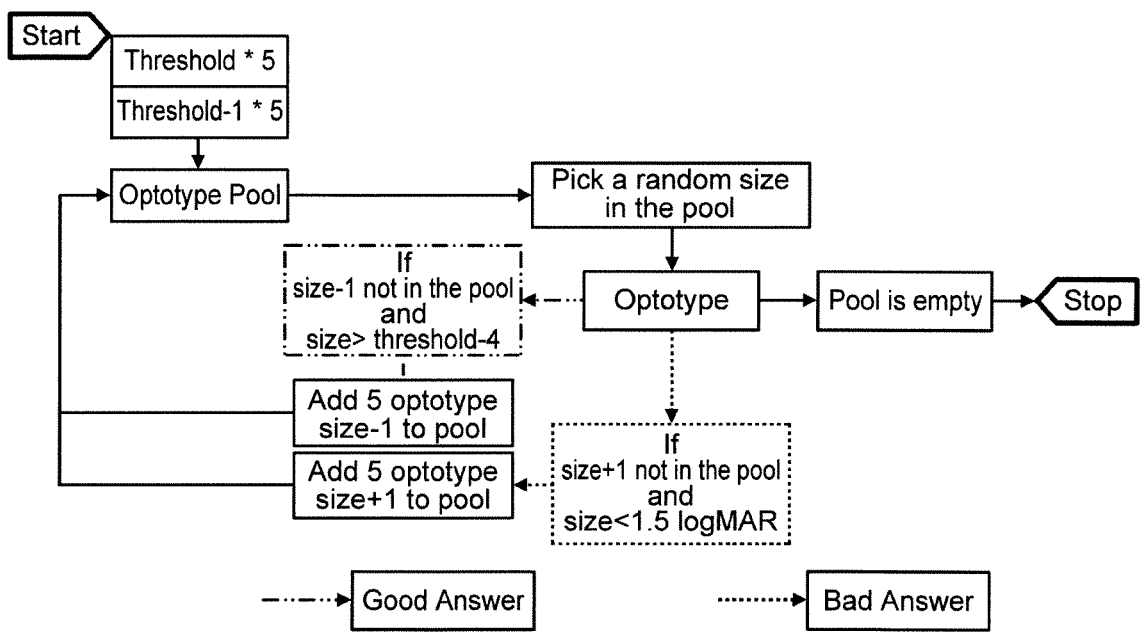

More specifically, as shown in FIG. 2(*b*), the threshold phase may present an "E" from a pool including 5 times the "E" in the size of the threshold found during the screening phase and another 5 times an "E" having a smaller size. Each time a correct answer is given, more symbols having a smaller size are added to the pool, while symbols having a larger size are added to the pool when the answer is incorrect. During this phase symbols of different sizes are mixed together.

At the end of the test, the most accurate estimation of the patient near visual acuity is retained by the module and will be used to start the next visual acuity test. That is, the screening test is only performed when the patient starts using the mobile device. All following tests only include the threshold phase, wherein the tests begin with the visual acuity of the previous test.

The primary difference between the test performed using the visual acuity module on the mobile device according to the invention and known tests performed at the physician's office is that known tests usually use different letters on a chart while the visual acuity module only displays a tumbling E. Therefore, the number of possible answers is reduced to 4 which increases the risk of having false positive answers. This however is compensated by the specific algorithm used in the visual acuity module. Furthermore, it is not necessary to be able to read letters for using the visual acuity module.

1.2 Contrast Sensitivity Module

The purpose of the Contrast Sensitivity (CS) module is to assess the user's contrast sensitivity. The module is inspired by the Pelli-Robson test, the gold standard in ophthalmology for assessing the contrast sensitivity (D. G. Pelli et al., Clin. Vision Sci., Vol. 2, No. 3, pp. 187-199, 1988). The algorithm used for finding the contrast sensitivity threshold is similar to the one used in the visual acuity module.

The module allows assessing contrast sensitivity in which the patient needs to indicate the orientation of the optotype "C" by sliding his/her finger in the corresponding direction (up, down, left or right). The optotype is known as "Landolt C": a ring with a gap, looking like the letter C with a specific stroke/blank ratio and proportions.

Figure 3:
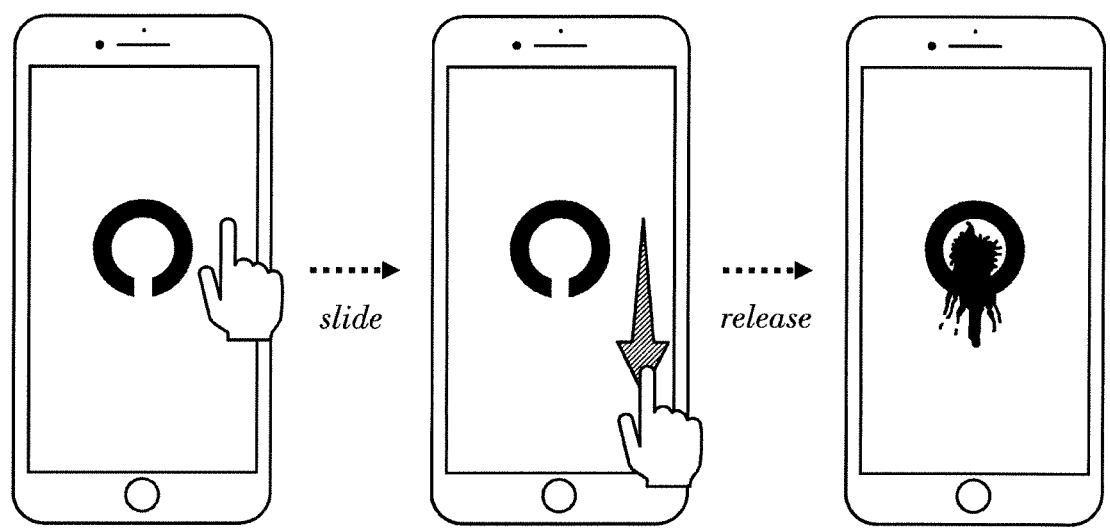
FIG. 3 shows the screen of the mobile device according to an embodiment of the invention used for testing contrast sensitivity.

In the module of the invention, several optotypes, e.g. "C", are displayed, one by one on the screen of the mobile device, preferably on the center of the screen, as shown in FIG. 3. The orientation and the contrast of the optotype change after each patient response, the optotype size is fixed. The optotype orientation is random but its contrast changes according to a predefined algorithm.

According to a special embodiment, the background is preferably white, and the optotype is displayed in gradients of black (e.g. grey).

According to a special embodiment, the optotype appears at the center of the screen. The user is able to use the entire screen to indicate the direction in which he/she sees the optotype by sliding his/her finger in the corresponding direction on the touchscreen of the mobile device.

The test can assess a range of contrast sensitivity from 0.0 to 1.8 logCS.

Figure 4:
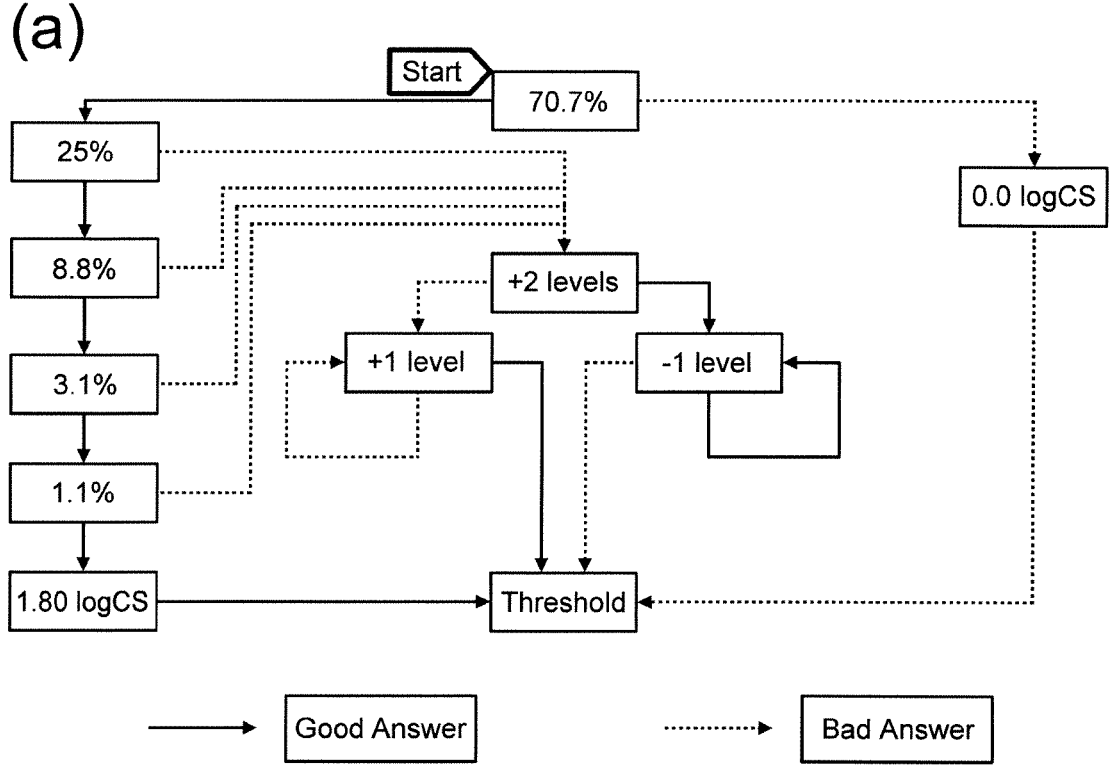
FIG. 4 illustrates an algorithm used for estimating contrast sensitivity in (a) a screening phase and (b) a threshold phase.
Figure 4:
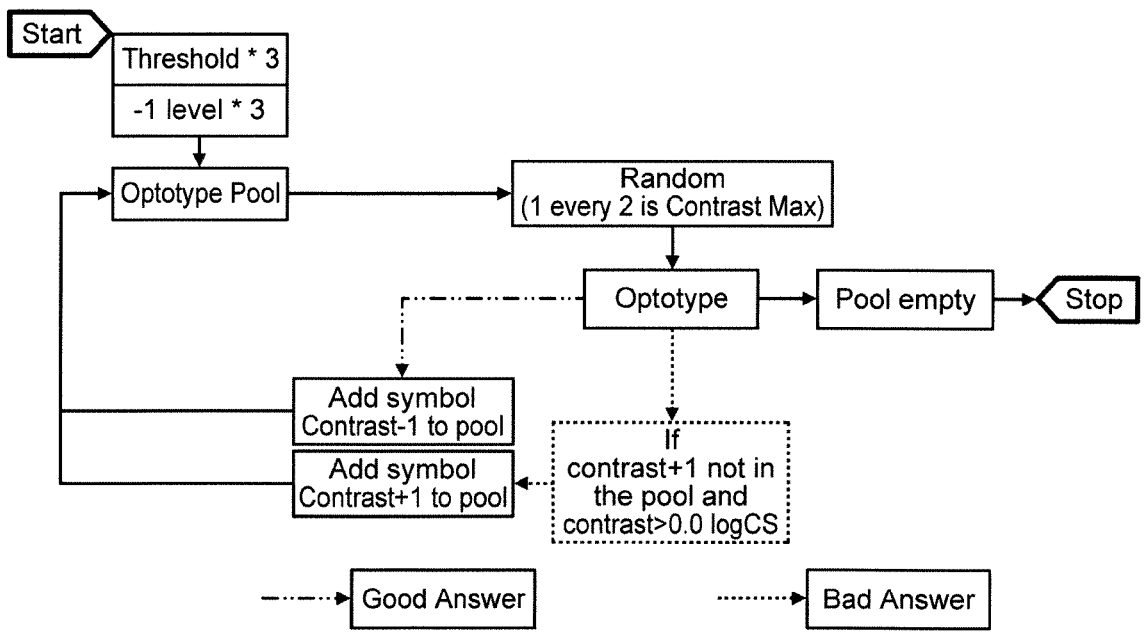
Figure 5:
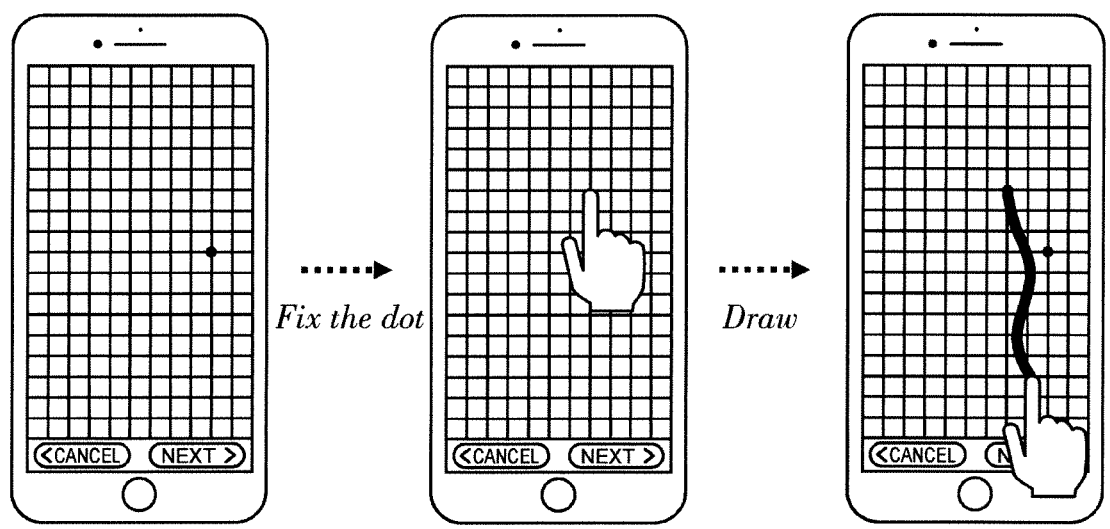
FIG. 5 shows the screen of the mobile device according to an embodiment of the invention displaying an Amsler Grid for testing visual disturbances.

The algorithm is similar to the one used to assess visual acuity described above and is also divided in two phases. The two phases can be independent. The first phase, the screening phase illustrated in FIG. 4(a), is a phase to obtain an approximation of the contrast sensitivity threshold. The second phase, the threshold phase illustrated in FIG. 4(b), is a more complete testing phase to obtain a precise value of the contrast sensitivity.

The screening phase is a standard staircase algorithm: if the user answers correct, a less contrasted optotype is presented, if not a more contrasted optotype is presented. The test stops after 2 false answers.

The threshold phase presents several times, e.g. 3 times, the optotype with the contrast found as the threshold in the screening phase. The threshold phase then presents harder steps, i.e. optotypes that are more difficult to perceive, if previous answers are correct and easier steps if not. During this phase, all the different contrasts of symbols are mixed together.

According to a preferred embodiment the background is white. According to a preferred embodiment the brightness of the background is selected in the range from about 100 lux to about 300 lux, more preferably from about 150 lux to about 250 lux, and even more preferably is about 200 lux. The contrast is calculated between the brightness of the background (preferably around 200 lux) and the brightness of the letter. A black letter (around 0 lux) is 100% contrast, a 50% grey letter (around 100 lux) is 50% contrast and a letter that is as the background (e.g. white) is 0% contrast.

Again, as for the test of visual acuity, the screening test is only performed when the patient starts using the mobile device. All following tests only include the threshold phase, wherein the tests begin with the visual acuity of the previous test.

In contrast to standard tests, or known apps for mobile devices, a Landolt C is used, rather than letters that are to be identified. Furthermore, the distance to the screen is preferably selected in the range from about 30 cm and about 50 cm, advantageously between about 35 cm and about 45 cm, ideally is fixed to 40 cm, as compared to tests performed at an ophthalmologist's office, where a distance from the Pelli-Robson contrast sensitivity chart of about 1 m is commonly used.

1.3 Amsler Grid Module

The purpose of the Amsler Grid module is to propose a digitalized version of the Amsler Grid (M. Amsler, Brit. J. Ophthal., Vol. 37, 521, 1953). The Amsler Grid is a diagnostic tool that aids in the detection of visual disturbances caused by changes in the retina, particularly the macula. It's usually done on a 10×10 cm grid printed on a piece of paper and is meant to be done at home.

The Amsler Grid module executed by the mobile device according to the invention is designed to provide a similar experience from what users are used to. It asks the user to draw line(s) if distortion(s) are seen or to fill or circle area(s) where the grid disappears while fixing the central dot. Since a device screen is usually too small to display a 10×10 cm grid, the grid may be divided in 3 parts, left/middle/right and the user can navigate from one to another by using the touch functionality of the touch screen and fill them one by one, while still focusing on the dot which moves when navigating in the grid. In a specific embodiment, the grid on the mobile device is squared, preferably the square measures at least 8×8 cm, preferably is 9×9 cm or 10×10 cm, and thus assesses a bit less than the paper one. That is, while the paper Amsler Grid allows covering 20 degrees of the visual field (10×10 cm at 40 cm distance), the Amsler Grid module only allows 18 degrees. However, peripherical vision is rarely affected anyway in the concerned pathologies. Apart from having a smaller size, the paper Amsler Grid is correctly reproduced on the mobile device's screen, including the scaling with squares of 0.5×0.5 cm.

The Amsler Grid test does not give a result or a value, but the module stores the encoded image of what the user has drawn in a storage space or memory, preferably accessible by the physician. The physician can then check the evolution of the disturbed areas and ask the user to come for a check if needed.

2. Parameter Monitoring

According to preferred embodiment, the said at least one test module is performed according to at least one controlled condition selected from the group:

setting of distance to screen, setting of screen brightness, and setting of ambient luminosity.

2.1 Distance to Screen

The test modules above are meant to be used with a distance preferably selected in the range from about 30 cm and about 50 cm, advantageously between about 35 cm and about 45 cm, ideally at about 40 cm between the device and at least one of the eyes of the user. In order to ensure that the distance is accurate and maintained before and during a test, the mobile device automatically estimates the distance and warns the user when he/she is mispositioned (too far, too close). The verification preferably is done continuously (several times per second) during each test. When properly positioned, the patient will continue to perform the test. Otherwise, the test is interrupted and the patient is asked to reposition himself/herself correctly.

The camera of the device, e.g. front camera, may be used to estimate this distance. Specifically, the app detects the face of the user on the images fed from the front camera of the device, track some face landmarks points (eyes, nose, mouth, etc) and compute the distance between the eyes inside the image in order to estimate the distance between the device and the eyes.

The distance to the screen is approximated with the formula:

$$Distance = ObjectSizeInRealWorld * FocalLength / ObjectSizeOnImageSensor$$

with

Distance: Distance to screen (output should be 40 cm)

ObjectSizeInRealWorld: Mean value of the user inter-pupillary distance (constant value=63 mm)

ObjectSizeOnImageSensor: Computed from the distance between the eyes in the image FocalLength: Focal Length of the device's front camera Using the face detection results inside the image fed from the camera allows for the distance to be estimated even with partial occlusion of the face when a patient needs to put his/her hand over his eye because he/she can't close it.

None of the self-testing solutions currently available in the prior art allow to check the distance to screen while performing the test.

2.2 Screen Brightness

Based on the standardized tests, the visual tests require the mobile device to display a specific brightness selected in the range from about 100 lux to about 300 lux, more preferably from about 150 lux to about 250 lux, and even more preferably of about 200 lux. When the visual tests are launched, the brightness is automatically set up. According to special embodiment the device is set up to prevent the user to change screen brightness through the device's settings.

2.3 Ambient Light

According to a preferred embodiment, vision tests such as the near visual acuity, contrast sensitivity and Amsler Grid are considered reliable only if the ambient light is selected in the range from 10 lux to about 2000 lux. Out of this range, the place is considered as too dark or too bright to perform the tests in good conditions.

In order to reproduce the good environment conditions, the mobile device detects if the external environment light is higher than about 2000 lux and lower than about 10 lux, e.g. by using the light sensor of the device (Android) or an algorithm using the camera input and parameters of the device (iOS).

While the user is performing the test, the device detects the ambient light. If the light is lower than about 10 lux or higher than about 2000 lux, a warning is displayed asking the user to go in a brighter or darker place.

Contrary to available apps for vision self-testing, e.g. using mobile devices, that are intended to provide for a quantitative monitoring of visual functions, the present invention thus continuously monitors the environmental conditions under which the tests are performed. It is thus possible to achieve meaningful results at home, which may be the basis for the physician to plan the intervals of further examination and treatment.

The present invention is further defined by the following items:

1. A mobile device for testing an individual's vision, the mobile device, including a screen for displaying a test pattern, wherein the mobile device is configured to perform a test of the individual's vision using the test pattern displayed on the screen of the mobile device and to evaluate a parameter which includes at least one of the distance between the eye of the individual and the screen;

the brightness at which the test pattern is displayed; and the ambient luminosity.

2. The mobile device according to item 1, wherein the parameter is evaluated prior to performing the test 3. The mobile device according to item 1, wherein the parameter is monitored during performing the test.

4. The mobile device according to any one of the preceding items, wherein the test of the individual's vision includes testing near visual acuity, wherein when testing near visual acuity, the screen is configured to display an optotype symbol, preferably having the general shape of an "E" at varying orientations and in varying sizes, wherein the orientation is to be indicated by the individual.

5. The mobile device according to any one of the preceding items, wherein the test of the individual's vision includes testing contrast sensitivity, wherein when testing contrast sensitivity, the screen is configured to display an optotype symbol, preferably having the general shape of a "C" with a ring at varying contrast and a gap having varying orientations, the orientation of the gab is to be indicated by the individual.

6. The mobile device according to any one of the preceding items, wherein the screen is configured to display a grid with a central dot, for detecting visual disturbances as the test of the individual's vision, in particular metamorphosis or scotoma, wherein distorted and/or blurred areas are to be indicated by the individual while focusing the view on the dot.

7. The mobile device according to any one of the preceding items, wherein the mobile device is configured to control the brightness at which the test pattern is displayed to be within a predefined range, in particular selected in the range from about 100 lux to about 300 lux, more preferably from about 150 lux to about 250 lux, and even more preferably is about 200 lux.

8. The mobile device according to any one of the preceding items, wherein the mobile device is configured to evaluate the distance between at least one eye of the individual, by tracking the face of the individual using a camera of the mobile device and the screen using the estimated distance between the eyes and to determine whether the estimated distance between the eyes and the screen is within a defined range, in particular between about 35 cm and about 45 cm.

9. The mobile device according to any one of the preceding items, wherein the mobile device further comprises a sensor configured to measure the ambient light, the mobile device being configured to determine whether the ambient light is within a defined range, in particular between about 10 lux and about 2000 lux 10. The mobile device according to item 8 or 9, wherein the mobile device is configured to only allow for the test to be performed when the estimated distance between the eyes and the screen and/or the ambient luminosity is within the defined ranges.

11. The mobile device according to any one of the preceding items, wherein the mobile device comprises a memory for storing the result of the performed visual test.

12. The mobile device according to any one of the preceding items, wherein the mobile device comprises a transmitter for sending the test result to a dashboard, that can be accessed online from the physician office, displaying medical data stored on a secured server 13. The mobile device according to any one of the preceding items, wherein the mobile device is further configured to execute a game, wherein the game is only allowed to be performed or to be continued when, at predetermine time intervals, a visual test is performed.

14. The mobile device according to any one of the preceding items, wherein the mobile device is a smartphone or a tablet computer.

15. A method of testing an individual's vision, comprising the steps of performing a test of the individual's vision using a test pattern displayed on a screen of a mobile device, such as a smartphone or a tablet computer, wherein the test of the individual's vision includes one or more of testing near visual acuity, testing contrast sensitivity, and detecting visual disturbances, in particular metamorphosis or scotoma, and evaluating a parameter which includes at least one of
the distance between the eye of the individual and the screen;
the brightness at which the test pattern is displayed; and
the ambient luminosity.

The invention claimed is:

1. A mobile device for testing an individual's vision, the mobile device including a screen for displaying at least one test pattern, wherein the mobile device is configured:
   (i) to present a test of visual acuity and a test for visual disturbances, the test for visual disturbances indicative of metamorphosis or scotoma associated with the individual's vision;
   (ii) to evaluate a parameter which includes at least one of:
      a distance between an eye of the individual and the screen;
      a brightness at which the at least one test pattern is displayed; or
      an ambient luminosity,
   (iii) to permit access to a game on the mobile device only after presenting the test of visual acuity and the test for visual disturbances; and
   (iv) to determine that access to the game is restricted a predetermined time interval after presenting the test of visual acuity and the test for visual disturbances,
   wherein the mobile device is configured to evaluate the ambient luminosity and to determine whether the ambient luminosity is within a defined range of between 10 lux and 2000 lux, and
   wherein the mobile device is configured to automatically display the at least one test pattern at a screen brightness between 100 lux and 300 lux upon launching the at least one test pattern.

2. The mobile device according to claim 1, wherein the distance between the eye of the individual and the screen is evaluated by detecting a face of the individual with two eyes on an image fed from a camera of the mobile device and computing a second distance between the two eyes inside the image in order to estimate the distance between the mobile device and the eye.

3. The mobile device according to claim 1, wherein when testing visual acuity, the screen is configured to display an optotype symbol.

4. The mobile device according to claim 3, wherein the optotype symbol has a general shape of an "E" at varying orientations and in varying sizes, wherein a first orientation is to be indicated by the individual.

5. The mobile device according to claim 1, wherein the mobile device is further configured to present a test for contrast sensitivity, wherein when testing contrast sensitivity, the screen is configured to display an optotype symbol.

6. The mobile device according to claim 5, wherein the optotype symbol has a general shape of a "C" with a ring at varying contrast and a gap having varying orientations, wherein an orientation of the gap is to be indicated by the individual.

7. The mobile device according to claim 1, wherein the screen is configured to display a grid with a central dot for detecting visual disturbances, and wherein distorted and/or blurred areas are to be indicated by the individual while focusing a view on the dot.

8. The mobile device according to claim 1, wherein the mobile device is configured to evaluate a second distance between the eyes of the individual and the screen, and to determine whether the second distance is within a defined range of between 35 cm and 45 cm.

9. The mobile device according to claim 1, wherein the at least one test pattern is displayed to be within a predefined range from 150 lux to 250 lux.

10. The mobile device according to claim 1, wherein the mobile device is configured to only allow for the test of visual acuity and the test for detecting visual disturbances to be presented when the distance between the eye of the individual and the screen is within the defined range.

11. The mobile device according to claim 1, wherein the mobile device comprises a memory configured to store a result corresponding to one or more of the test of visual acuity and the test for detecting visual disturbances indicative of metamorphosis or scotoma.

12. The mobile device according to claim 11, wherein the mobile device comprises a transmitter configured to send the result to a secured server that can be accessed online from a physician office.

13. The mobile device according to claim 1, wherein the mobile device is a smartphone or a tablet computer.

14. The mobile device according to claim 1, wherein the at least one test pattern is displayed at 200 lux.

15. The mobile device of claim 1, wherein the game is a puzzle.

16. A method of testing an individual's vision, comprising the steps of:
   (i) presenting a test of visual acuity and a test for detecting visual disturbances, the test for detecting visual disturbances indicative of metamorphosis or scotoma associated with the individual's vision;
   (ii) evaluating a parameter which includes at least one of:
      a distance between an eye of the individual and the screen;
      a brightness at which the at least one test pattern is displayed; or an ambient luminosity;

(iii) permitting access to a game on the mobile device only after presenting the test of visual acuity and the test for detecting visual disturbances;
(iv) determining that access to the game is restricted for a predetermined time interval after the test of visual acuity and the test for detecting visual disturbances;
wherein the mobile device is configured to evaluate the ambient luminosity and to determine whether the ambient luminosity is within a defined range of between 10 lux and 2000 lux, and
wherein the mobile device is configured to automatically display the at least one test pattern at a screen brightness between 100 lux and 300 lux upon launching the at least one test pattern.

17. The method of claim 16, wherein the game is a puzzle.

\* \* \* \* \*